US010996826B2

(12) United States Patent
Griffiths

(10) Patent No.: US 10,996,826 B2
(45) Date of Patent: May 4, 2021

(54) SYSTEMS AND METHODS FOR DISPLAY OF PROJECT MANAGEMENT TIMELINES

(71) Applicant: William G. Griffiths, Glenwood Landing, NY (US)

(72) Inventor: William G. Griffiths, Glenwood Landing, NY (US)

(*) Notice: Subject to any disclaimer, the term of this patent is extended or adjusted under 35 U.S.C. 154(b) by 0 days.

(21) Appl. No.: 16/787,316

(22) Filed: Feb. 11, 2020

(65) Prior Publication Data
US 2020/0257416 A1    Aug. 13, 2020

Related U.S. Application Data

(60) Provisional application No. 62/803,782, filed on Feb. 11, 2019, provisional application No. 62/938,605, filed on Nov. 21, 2019.

(51) Int. Cl.
*G06F 3/0486* (2013.01)
*G06F 3/0482* (2013.01)
*G06Q 10/10* (2012.01)
*G06F 3/0483* (2013.01)
*G06F 21/62* (2013.01)

(52) U.S. Cl.
CPC .......... *G06F 3/0483* (2013.01); *G06F 3/0482* (2013.01); *G06F 3/0486* (2013.01); *G06F 21/62* (2013.01); *G06Q 10/103* (2013.01); *G06Q 10/107* (2013.01); *G06Q 10/109* (2013.01); *G06F 2203/04804* (2013.01)

(58) Field of Classification Search
CPC ...... G06F 3/0483; G06F 21/62; G06F 3/0482; G06F 3/0486; G06F 2203/04804; G06Q 10/109; G06Q 10/103; G06Q 10/107
See application file for complete search history.

(56) References Cited

U.S. PATENT DOCUMENTS

| 5,912,668 A | * | 6/1999 | Sciammarella | ..... G06F 3/04845 715/781 |
| 6,854,088 B2 | | 2/2005 | Massengale et al. | |
| 7,712,049 B2 | * | 5/2010 | Williams | .............. G06F 3/0482 715/834 |

(Continued)

OTHER PUBLICATIONS

International Search Report and Written Opinion issued by the International Searching Authority in relation to PCT/US2020/017621 dated Jun. 12, 2020.

*Primary Examiner* — Yongjia Pan
(74) *Attorney, Agent, or Firm* — Carter, DeLuca & Farrell LLP; George Likourezos

(57) ABSTRACT

A computer-implemented method of display of project management timelines is presented in accordance with aspects of the present disclosure. In various embodiments, the method includes displaying a spinning spiral temporal element with spiral rings, starting from a center and moving outwards over time, including one or more stars disposed on the rings in chronological order of present importance, wherein each star includes a folder; selecting a star in the closest orbit; and displaying a page containing the selected star at the center of a spinning spiral temporal element with spiral rings, starting from a center and moving outwards over time, including one or more planets disposed on the rings in chronological order of present importance, wherein each planet includes a folder. The planet includes at least one of contact info, contract, scope of work, or time frame.

24 Claims, 8 Drawing Sheets

(56) References Cited

U.S. PATENT DOCUMENTS

| | | | |
|---|---|---|---|
| 8,099,312 B2 | 1/2012 | Jin et al. | |
| 8,893,140 B2 | 11/2014 | Meyer | |
| 9,437,021 B2 * | 9/2016 | Deshpande | G06Q 10/06 |
| 10,042,527 B2 * | 8/2018 | Seuthe | G06Q 10/109 |
| 10,062,045 B2 * | 8/2018 | Brown | G06Q 10/10 |
| 10,088,973 B2 | 10/2018 | Shoham et al. | |
| 2002/0054040 A1 * | 5/2002 | Moshal | G06Q 40/04 345/440 |
| 2003/0222896 A1 * | 12/2003 | Hagmann | G06Q 10/063112 715/700 |
| 2004/0268268 A1 * | 12/2004 | Scheu | G06F 3/0482 715/835 |
| 2005/0060667 A1 * | 3/2005 | Robbins | G06T 11/206 715/848 |
| 2006/0041461 A1 * | 2/2006 | Vucina | G06Q 10/10 345/440 |
| 2006/0048076 A1 * | 3/2006 | Vronay | G06F 19/904 715/850 |
| 2007/0120856 A1 * | 5/2007 | De Ruyter | G06Q 10/109 345/440 |
| 2008/0209546 A1 * | 8/2008 | Kim | G06F 3/04883 726/19 |
| 2008/0313536 A1 * | 12/2008 | Larsen | G06Q 10/06 715/273 |
| 2010/0125814 A1 * | 5/2010 | Lemons | G06Q 10/06 715/853 |
| 2010/0162170 A1 | 6/2010 | Johns et al. | |
| 2010/0217745 A1 | 8/2010 | Song et al. | |
| 2011/0070924 A1 * | 3/2011 | Kim | G06Q 10/02 455/566 |
| 2014/0098140 A1 * | 4/2014 | Tran | G09G 5/00 345/660 |
| 2014/0330517 A1 | 11/2014 | Barnes | |
| 2015/0033189 A1 * | 1/2015 | Sachs | G06Q 10/06 715/830 |
| 2015/0067564 A1 * | 3/2015 | Foley | G06F 3/04842 715/771 |
| 2015/0309675 A1 * | 10/2015 | Blinov | G06F 3/0481 715/834 |
| 2015/0363733 A1 | 12/2015 | Brown | |
| 2016/0048996 A1 * | 2/2016 | Nakao | G06Q 10/109 345/419 |
| 2016/0132817 A1 * | 5/2016 | Kongot | G06Q 10/063114 705/7.15 |
| 2017/0124531 A1 * | 5/2017 | McCormack | G06F 3/04845 |

\* cited by examiner

US 10,996,826 B2

SYSTEMS AND METHODS FOR DISPLAY OF PROJECT MANAGEMENT TIMELINES

CROSS-REFERENCE TO RELATED APPLICATIONS

This application claims the benefit of and priority to U.S. Provisional Patent Application Ser. No. 62/803,782, filed on Feb. 11, 2019, and U.S. Provisional Patent Application Ser. No. 62/938,605, filed on Nov. 21, 2019, the entire contents of which is incorporated by reference herein.

TECHNICAL FIELD

The present application relates to systems and methods for the display of project management timelines, and in particular, to the 3D display of project management timelines.

SUMMARY

This disclosure relates to the display of project management timelines. In accordance with aspects of the present disclosure, a computer-implemented method of display of project management timelines is presented. The method includes displaying a spinning spiral temporal element with rings, starting from a center and moving outwards over time, including one or more stars disposed on the rings in chronological order of present importance, wherein each star includes a folder, selecting a star in the closest orbit, and displaying a page containing the selected star at the center of a spinning spiral temporal element with spiral rings, starting from a center and moving outwards over time, including one or more planets disposed on the rings in chronological order of present importance, wherein each planet includes a folder. The planet includes at least one of contact info, contract, scope of work, upload documents, or time frame.

In accordance with aspects of the present disclosure, the method further includes selecting a planet in the closest orbit, and displaying a page containing the selected planet at a center of a 3D spinning spiral temporal element with spiral rings, starting from the center and moving outwards over time, including one or more moons disposed on the rings in chronological order of present importance, wherein each moon includes a folder. The moon includes at least one of contact info, contract, scope of work, upload documents, or time frame.

In an aspect of the present disclosure, comets, or events, approach the center as the date draws closer.

In accordance with aspects of the disclosure, the spinning spiral temporal element may further include a predetermined number of subdivisions configured to organize each star. Each star may align with one of the predetermined number of subdivisions.

In an aspect of the present disclosure, the method may further include displaying, on a display, a task list, the task list including one or more tasks due on a particular day; determining if one task of the one or more tasks is swiped on the display; changing a translucence of the task based on the determination; and setting time parameters for time-sensitive tasks wherein a user is notified via text and alarm about the time-sensitive task.

In another aspect of the present disclosure, the method may further include collaborating and interacting with select members within the project by email, text, video and/or chat by sending an entity to a recipient.

In yet another aspect of the present disclosure, the method may further include sending videos, texts, and/or e-mails to an existing member and/or a non-member, to permit two-way collaboration and interaction between sender and recipient; and restricting information which a recipient is permitted to see and access.

In a further aspect of the present disclosure, the method may further include transmitting a notification, to a recipient, that a user has sent them information relevant to a project or task; receiving, by the recipient, the notification; displaying by a notification icon that a notification is available; and access, by the recipient, the information from a notification icon based on tapping on the notification.

In accordance with aspects of the present disclosure, a computer-implemented method of display of project management timelines is presented. The method includes dragging and dropping at least one first element from a first area to a second area, the at least one first element includes at least one of a main project, a task, a business task, or a personal task. The second area includes a spinning spiral temporal element with spiral rings, starting from a center and moving outwards over time. The second area is set from at least one of an hour, a day, a week, a month, or a year. The first element includes the start date and/or due date. After the dragging and dropping, the least one first element is displayed in chronological order on the spinning spiral temporal element, moving the at least one first element along the spinning spiral temporal element based on at least one of the current time or the current date, selecting one at least one first element, and accessing information contained within the at least one first element.

In accordance with aspects of the present disclosure, a system for display of project management timelines is presented. The system includes a processor, and a memory that is coupled to the processor and stores one or more computer-readable instructions. The computer-readable instructions cause, when executed by the processor, the system to: display a first spinning spiral temporal element with spiral rings, starting from a center and moving outwards over time, including one or more stars disposed on the rings in chronological order of present importance, wherein each star includes a folder; select a star; and display a page containing the selected star at the center of a spinning spiral temporal element with spiral rings, starting from a center and moving outwards over time, including one or more planets disposed on the rings in chronological order of present importance, wherein each planet includes a folder. The planet includes at least one of contact info, contract, scope of work, upload documents, or time frame.

In accordance with aspects of the disclosure, the instructions when executed may further cause the system to: select a planet; and display a page containing the selected planet at the center of a spinning spiral temporal element with spiral rings, starting from a center and moving outwards over time, including one or more moons disposed on the rings in chronological order of present importance. Each moon includes a folder, The moon includes at least one of contact info, contract, scope of work, upload documents, or time frame.

In an aspect of the present disclosure, comets or events, may approach the center as a date draws closer.

In another aspect of the present disclosure, the spinning spiral temporal element may further include a predetermined number of subdivisions configured to organize each star. Each star may align with one of the predetermined number of subdivisions.

In yet another aspect of the present disclosure, the instructions when executed may further cause the system to: display, on a display, a task list, the task list including one or more tasks due on a particular day; determine if one task of the one or more tasks is swiped on the display; and change a translucence of the task based on the determination; and set time parameters for time-sensitive tasks wherein a user is notified via text and alarm about the time-sensitive task.

In a further aspect of the present disclosure, the method may further include the ability to collaborate and interact with select members within the project via email, text, video and chat by sending an entity to a recipient.

In accordance with aspects of the disclosure, the instructions when executed further cause the system to: send videos, texts, and/or e-mails to existing members and/or others to permit two-way collaboration and interaction between sender and recipient; and restrict information which a recipient is permitted to see and access.

In an aspect of the present disclosure, the instructions when executed may further cause the system to: transmit a notification, to a recipient, that a user has sent them information relevant to a project or task; receive, by the recipient, the notification; display by a notification icon that a notification is available; and access, by the recipient, the information from a notification icon based on tapping on the notification.

In accordance with aspects of the present disclosure, the first and the second temporal element may include a first position, a second position, and a predetermined number of placement positions. The distance between positions decreases non-linearly starting from the second position of the temporal element as the placement position approaches the first position of the temporal element.

In accordance with aspects of the present disclosure, a system for display of project management timelines is presented. The system includes a processor, and a memory that is coupled to the processor and stores one or more computer-readable instructions. The computer-readable instructions cause, when executed by the processor, the system to: display a first temporal element with graphical indicia, starting from a first location of the temporal element and moving towards a second location of the temporal element over time, including one or more first elements disposed on the graphical indicia in chronological order of present importance, wherein each of the one or more first elements includes a folder; select one of the one or more first elements; and display a page containing the selected one or more first elements at a particular location of a second temporal element with graphical indicia, starting from a first location of the second temporal element and moving towards a second location of the second temporal element over time, including one or more second elements disposed on the graphical indicia in chronological order of present importance, wherein each of the one or more second elements includes a folder. The one or more second elements includes at least one of contact info, contract, scope of work, upload documents, or time frame.

In accordance with aspects of the present disclosure, the first and the second temporal element may include a first position, a second position, and a predetermined number of placement positions. The distance between positions decreases non-linearly starting from the second position of the temporal element as the placement position approaches the first position of the temporal element.

In accordance with aspects of the disclosure, the instructions when executed may further cause the system to: select a second element; and display a page containing the selected second element at the center of a third temporal element with graphical indicia, starting from a first location of the temporal element and moving towards a second location of the temporal element over time, including one or more third elements disposed on the graphical indicia in chronological order of present importance, wherein each of the one or more third elements includes a folder. The third element may include contact info, contract, scope of work, upload documents, and/or time frame.

In an aspect of the present disclosure, comets or events may approach the center as a date draws closer.

In another aspect of the present disclosure, the first temporal element with graphical indicia may further include a predetermined number of subdivisions configured to organize each first element. Each first element may align with one of the predetermined number of subdivisions.

In yet another aspect of the present disclosure, the instructions when executed may further cause the system to: display, on a display, a task list, the task list including one or more tasks due on a particular day; determine if one task of the one or more tasks is swiped on the display; and change a translucence of the task based on the determination; and set time parameters for time-sensitive tasks wherein a user is notified via text and alarm about the time-sensitive task.

In a further aspect of the present disclosure, the method may further include the ability to collaborate and interact with select members within the project via email, text, video and chat by sending an entity to a recipient.

In accordance with aspects of the disclosure, the instructions when executed further cause the system to: send videos, texts, and/or e-mails to existing members and/or others to permit two-way collaboration and interaction between sender and recipient; and restrict information which a recipient is permitted to see and access.

In an aspect of the present disclosure, the instructions when executed may further cause the system to: transmit a notification, to a recipient, that a user has sent them information relevant to a project or task; receive, by the recipient, the notification; display by a notification icon that a notification is available; and access, by the recipient, the information from a notification icon based on tapping on the notification.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
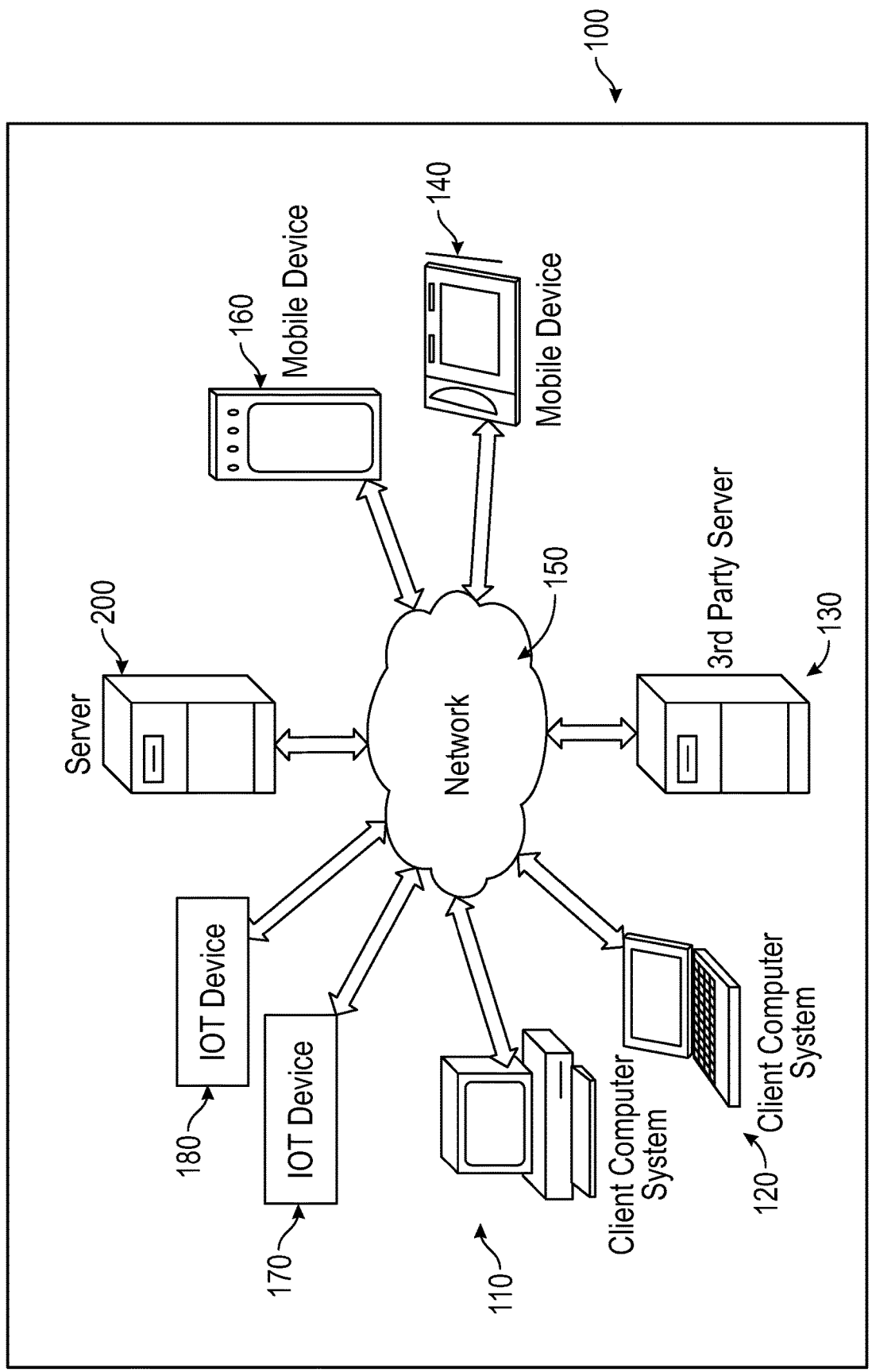
FIG. 1 is a network diagram illustration, which shows an exemplary networked environment for a computer-implemented method of 3D display of project management timelines in accordance with aspects of the present disclosure.

This disclosure relates to systems and methods for the 3D display of project management timelines.

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Referring to FIG. 1, there is shown an illustration of an exemplary networked environment 100 in accordance with aspects of the present disclosure. The system 100 includes one or more client computer systems 110, 120, a network 150, a server 200, and one or more mobile device 140, 160. The mobile device(s) 140, 160, or the client computer system 110, 120, communicate with the server 200 across the network 150 to manage data. In one example, the server 200 may store a user's personal profile and settings. The server 200 communicates the updated spinning spiral temporal element back over the network 150 to the user mobile device 140, and an updated spinning spiral temporal element is displayed on the user mobile device 140. In various embodiments, the spiral may include an Archimedean spiral.

In the illustrated embodiment, the networked environment 100 includes a third party server 130. In various embodiments, the third-party server 130 can store and communicate user tasks, and the server 200 can import such user tasks from the third party server 130. In various embodiments, data, services, or applications from third-party servers 130 may be used by the server 200 for scheduling operations. Such data from third-party servers 130 can include, for example, a user's available time, appointments, bank balances, tags, or the weather forecast. For example, the server 200 may allow social integration, such as allowing sharing of projects, events, tasks, documents, pictures, etc.

The network 150 may be wired or wireless and can utilize technologies such as WiFi, Ethernet, Internet Protocol, 3G, and/or 4G, or other communication technologies. The network 150 may include, for example, but is not limited to, a cellular network, residential broadband, satellite communications, private network, the Internet, local area network, wide area network, storage area network, campus area network, personal area network, or metropolitan area network.

The term "application" may include a computer program designed to perform particular functions, tasks, or activities for the benefit of a user. Application may refer to, for example, software running locally or remotely, as a stand-alone program or in a web browser, or other software that would be understood by one skilled in the art to be an application. An application may run on the server 200 or on a user device, including, for example, on a mobile device 140 or a client computer system 110.

Figure 2:
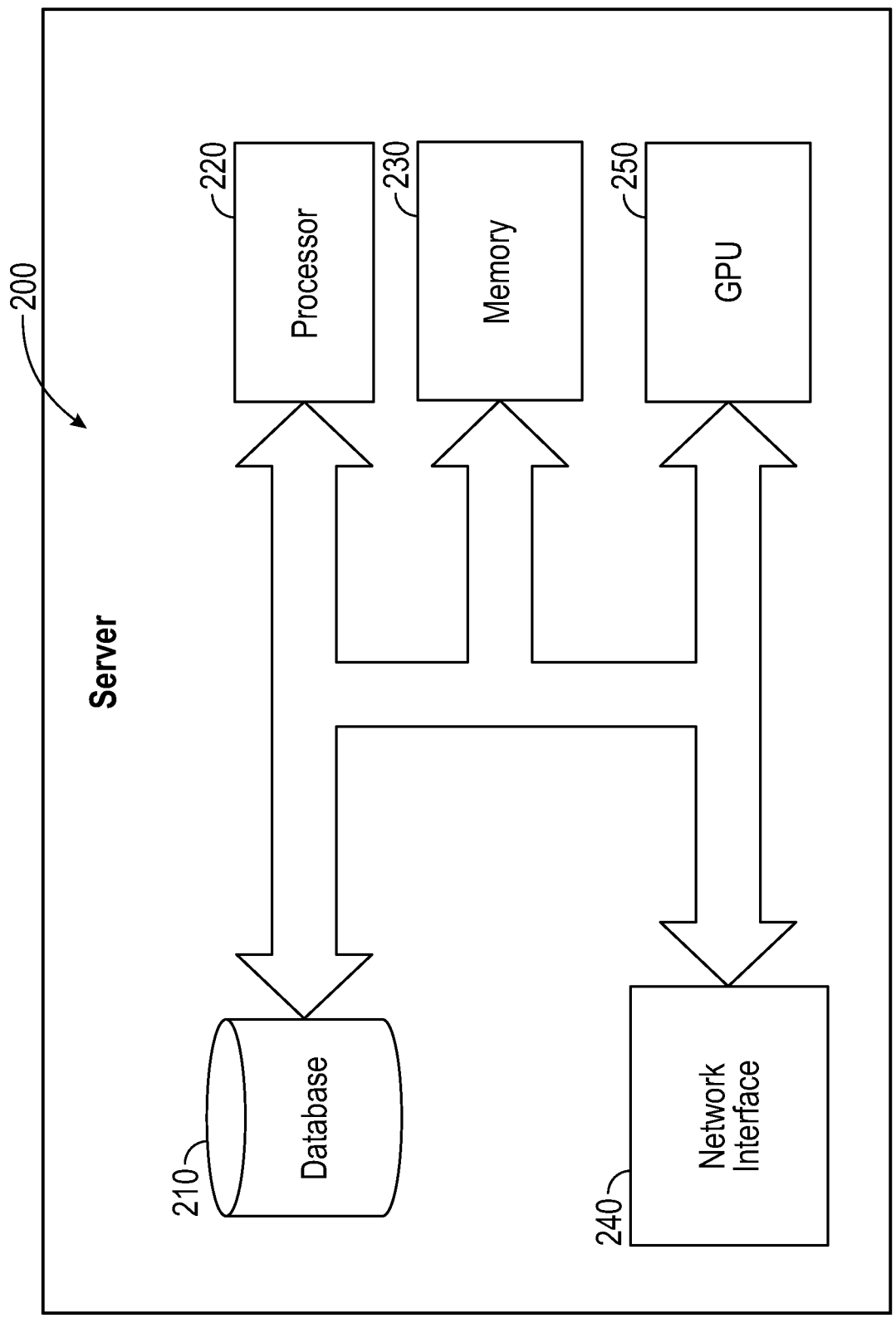
FIG. 2 is a block diagram of an exemplary server of FIG. 1 in accordance with aspects of the present disclosure.

Referring now to FIG. 2, there is shown an illustration of exemplary components in the server 200 of FIG. 1, in accordance with aspects of the present disclosure. The server 200 includes, for example, a database 210, one or more processors 220, at least one memory 230, and a network interface 240.

The database 210 can be located in storage. The term "storage" may refer to any device or material from which information may be capable of being accessed or reproduced, or held in an electromagnetic or optical form for access by a computer processor. Storage may be, for example, volatile memory such as RAM, non-volatile memory, which permanently hold digital data until purposely erased, such as flash memory, magnetic devices such as hard disk drives, and optical media such as a CD, DVD, Blu-ray disc, or the like.

In one exemplary aspect of the present disclosure, a web interface can run on the server 200, where the interface includes a calendar application. In various embodiments, data may be stored on the server 200, including, for example, user tasks, preferences, schedule appointments, historical data, past weather, documents, and/or other data. The data can be stored in the server database 210, and sent via the system bus to the processor 220.

As will be described in more detail later herein, the processor 220 executes various processes based on instructions that can be stored in the server memory 230, and utilizing the data from the database 210. With reference also to FIG. 1, a request from a user device, such as a mobile device 140 or a client computer 110, can be communicated to the server 200, through the server's network interface 240. For example, a user can conduct scheduling operations on a user computer 110. The server 200 can access the user's schedule, apply processing to the user's schedule, and provide the user with an updated schedule as a result.

The updated schedule may appear through a web interface on the server 200, and the interface can include a calendar application that the user would see on his computer 110. In various embodiments, push notifications can be sent to a browser in mobile devices 140, 160. Users can be notified at the start of each task by way of a push notification. Similarly, users can be notified at the end of a task if another task is not beginning immediately by way of a push notification. In various embodiments, the application can provide a push notification to users to reschedule when the application detects a significant change to a task or to a user's schedule or when a deadline is reached or a notification is delivered to a member.

In various embodiments, the application employs an intuitive 3D solar system metaphor, complete with Stars, Planets, Moons, Satellites, and Comets that consistently provides users with the tools necessary to efficiently manage short term, medium-term and long term life and business goals.

Figure 3:
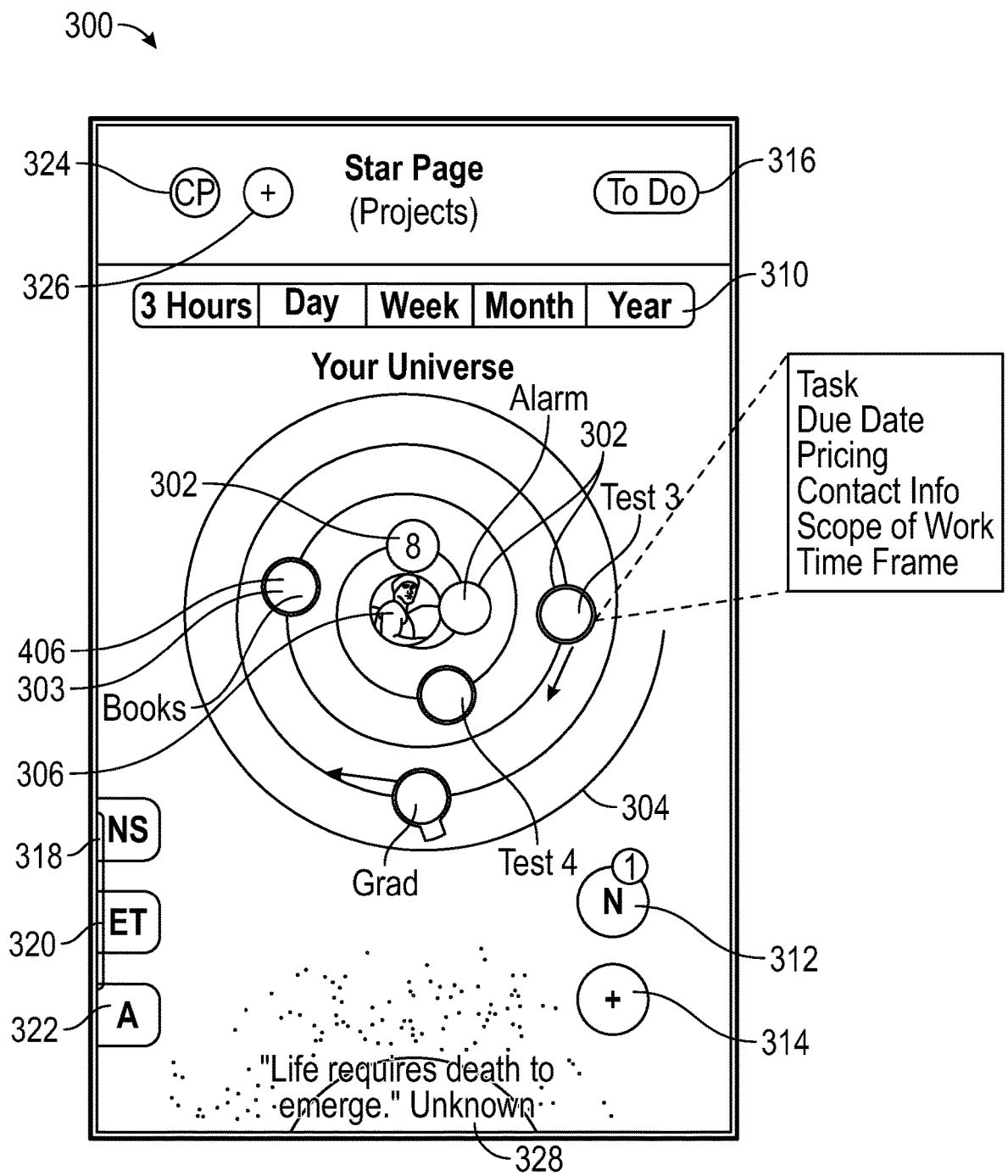
FIG. 3 is an exemplary diagram of an embodiment of the system of FIG. 1.

With reference to FIG. 3, the planet page 300 of the application is shown. In the planet page 300, YOU 306 are the center of your universe. For example, the user may download and then log-in to the application (via the app, the website, Facebook, etc.). An initial page may appear that shows YOU 306 in the middle of your universe of work and life. In various embodiments, surrounding YOU 306 is a spinning spiral temporal element 304, that can be set from within the application, for example, to hours, days, weeks, months, and years depending on the user's desired time frames for each project or task. The application includes hours, days, weeks, months, and years setting 310 to control this display. In various embodiments, the spinning spiral temporal element 304 may be a 3D spinning spiral or a 2D spinning spiral.

In various embodiments, the screen may include several tabs, including New Stars (NS) 318, Extended Time (ET) 320, Archive (A) 322, Add Contacts (+) 314, Notifications (N) 312, To Do 316, Comet Page (CP) 324, and an inspirational quote 328.

In various embodiments, a new star may be added by clicking on the New Star (NS) tab 318. The NS tab 318 allows a user to populate the new star 302 with information including start and due dates, start and stop times, a description of the task, a task priority, contact info, pricing, scope of work, time frame, and other relevant information regarding the task. Any Stars 302 that are shared with another user may send automatic updates to the other user. The other user may receive notifications regarding these updates. Once a Star 302 has been populated with data from within the Application Dashboard, the Star 302 appears on the spinning spiral temporal element 304 at an appropriate location based on the hours, days, weeks, months, and years setting 310.

The Extended Time (ET) 320 tab may display Stars 302 that are expired and/or have gone past their original due date. The Archive (A) 322 tab may be used to archive Stars 302 (or Planets FIG. 4). In various embodiments, the Archive (A) 322 tab may allow the user to create a video conference, send a message to other users, and/or add notes and comments.

The Add Contacts (+) 314 tab may be used to add contacts either from the user's device or manually entering the contacts. The contacts may be used to share the Star 302 or for informational purposes. For example, if the Star 302 is for a plumbing job, the contact may be the plumber. The Notifications (N) 312 tab may be used to review any incoming notifications.

In various embodiments, a Star 302 may include a short description of the task as well as an outer-ring 303. In various embodiments, priorities amongst Stars 302 may be shown via colors as well as the placement of the Star 302 on the spinning spiral temporal element 304. The outer-ring 303 may have various colors indicating the progress of the task. For example, the color orange may indicate the task is heading towards start, whereas green may indicate the task is heading towards finished. In various embodiments, the brightness of the color of the ring may change to indicate priority. For example, the brighter the color, the higher the priority. The Star 302 may also include a number in a case where two or more items have the same temporal location on the spinning spiral temporal element 304. For example if two tasks were due on the same date, the Star 302 may display the number "2."

In various embodiments, above YOU 306 on the page are a set of Stars 302, each representing a main project, task or component of your business and/or personal life. Once a Star 302 has been populated with data from within the Application Dashboard, the Star 302 may be dragged and dropped by the user onto a location on the temporal spiral element in relation to its urgency relative to the user's other projects, tasks, and their respective priorities. In various embodiments, based on the data entered by the user, the application may be able to place the Star 302 at the proper place on the temporal element.

Figure 4:
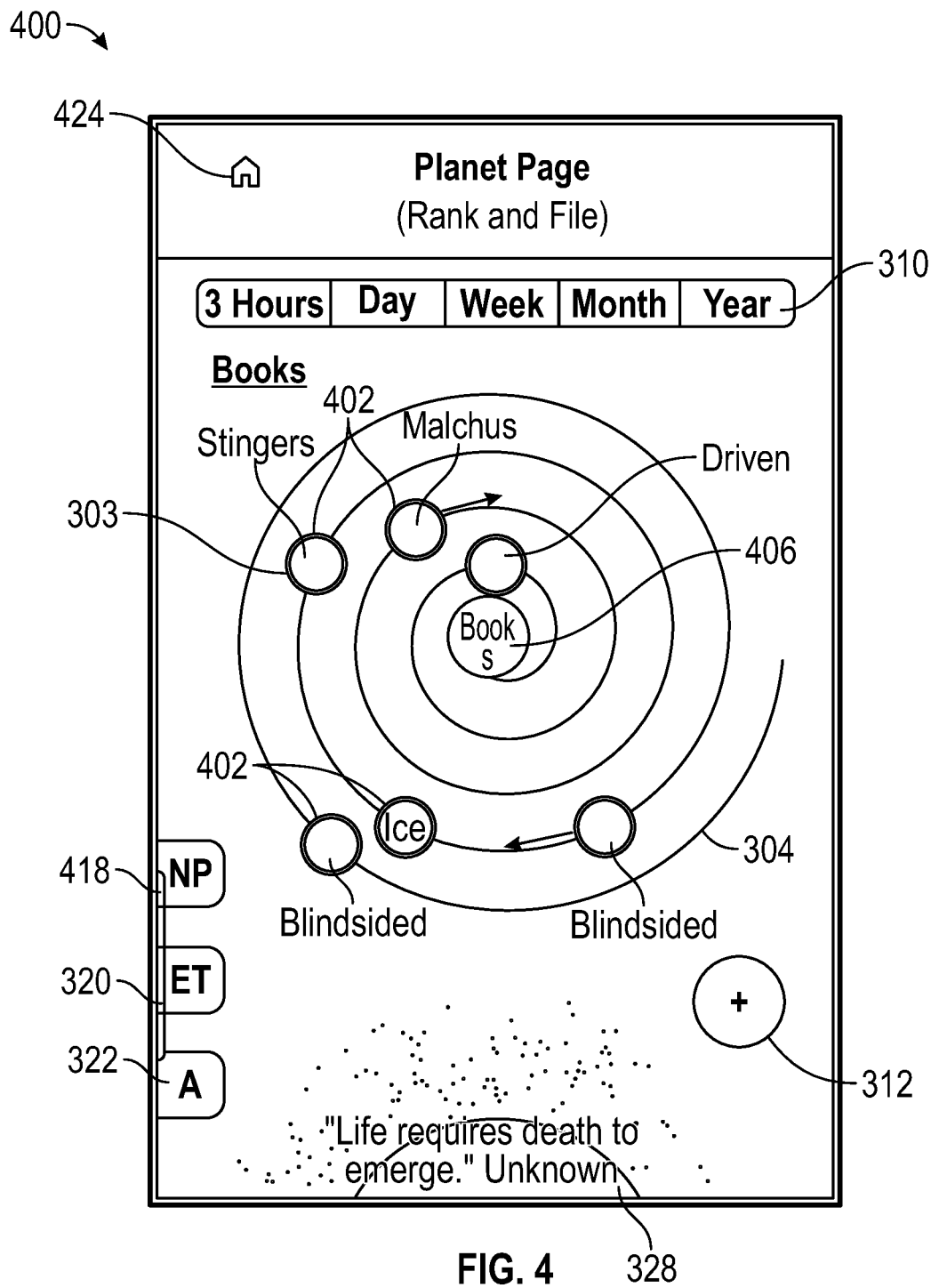
FIG. 4 is an exemplary diagram of an embodiment of the system of FIG. 1.

With reference to FIG. 4, the planet page 400 is shown. In various embodiments, if the user desires to access the data within a Star 302 in the star page 300 (FIG. 3), the user may select a Star 302 (for example, "Books") and a planet page 400 is presented with the selected Star 406 at the center, with its own spinning spiral temporal element 304 (in the same way that YOU 306 were at the center of YOUR own spinning spiral temporal element on the preceding page of the application). Located on the spinning spiral temporal element 304 are planets 402, representing folders within the selected Star 406 files. Those folders may be populated with data from within the application dashboard as with the Stars 302 on the previous pages. In various embodiments, priorities amongst Planets 402 can be shown via colors as well as the placement of the Planet on the spinning spiral temporal element.

In various embodiments, the screen may include several tabs, including New planets (NP) 418, Extended Time (ET) 320, Archive (A) 322, Add Contacts (+) 314, Notifications (N) 312, Home Page 424, and an inspirational quote 328.

In various embodiments, a new Planet 402 may be added by clicking on the New Planet (NP) tab 418. The NP tab 418 allows a user to populate the new Planet 402 with information including start and due dates, start and stop times, a description of the task, a task priority, contact info, pricing, scope of work, time frame, and other relevant information regarding the task. Any Planets 402 that are shared with another user may send automatic updates to the other user. The other user may receive notifications regarding these updates. Once a Planet 402 has been populated with data from within the Application Dashboard, the Planet 402 appears on the spinning spiral temporal element 304 at an appropriate location based on the hours, days, weeks, months, and years setting 310.

The Extended Time (ET) 320 tab may display Planets 402 that are expired and/or have gone past their original due date. The Archive (A) 322 tab may be used to archive Planets 402. In various embodiments, the Archive (A) 322 tab may allow the user to create a video conference, send a message to other users, and/or add notes and comments.

The Add Contacts (+) 314 tab may be used to add contacts either from the user's device or manually entering the contacts. The contacts may be used to share the Planet 402 or for informational purposes. For example, if the Planet 402 is for the release date for a book, the contact may be the publisher.

In various embodiments, a Planet 402 may include a short description of the task as well as an outer-ring 303. In various embodiments, priorities amongst Planet 402 may be shown via colors as well as the placement of the Planet 402 on the spinning spiral temporal element 304. The outer-ring 303 may have various colors indicating the progress of the task. For example, the color orange may indicate the task is heading towards the start date of the task, whereas green may indicate the task is heading towards finished. In various embodiments, the brightness of the color of the ring may change to indicate priority. For example, the brighter the color, the higher the priority. The Planet 402 may also include a number in a case where two or more items have the same temporal location on the spinning spiral temporal element 304. For example if two tasks were due on the same date, the planet may display the number "2."

In various embodiments, as with the Stars 302, Planets 402 may be dragged and dropped by the user onto a location on the spinning spiral temporal element 304 in relation to its urgency relative to the user's other projects, tasks, and their respective priorities or they can allow the application to perform that task automatically.

Figure 5:
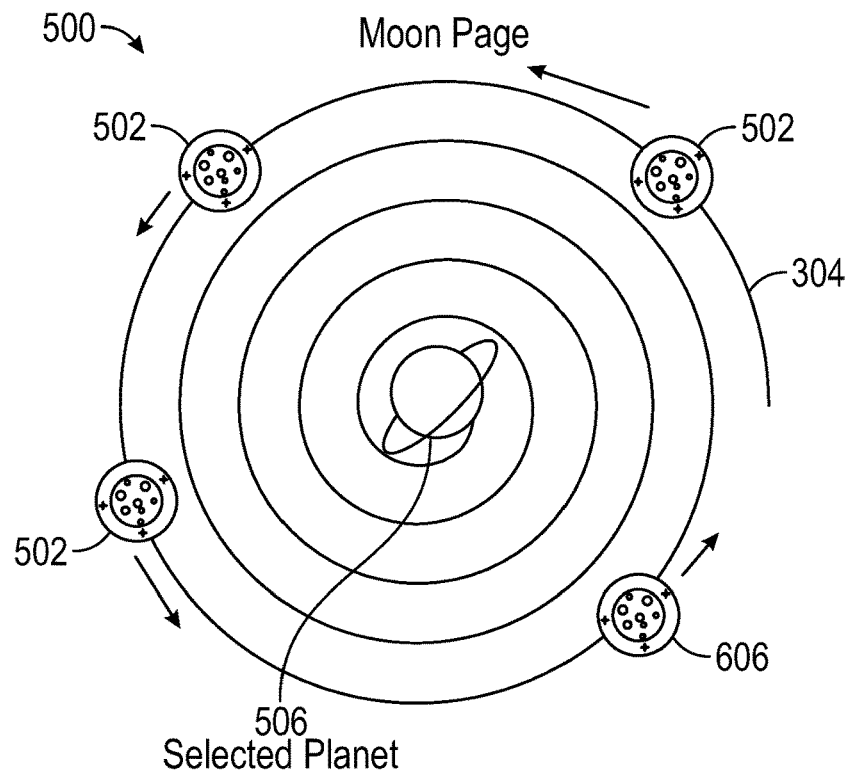
FIG. 5 is an exemplary diagram of an embodiment of the system of FIG. 1.

With reference to FIG. 5, if the user desires to access the data within the Planet 506, the user may double click on the Planet 506 and a new page 500 is presented with the Planet 506 at the center, with its own spinning spiral temporal element 304 (in the same way that the Star 406 was at the center of its own spinning spiral temporal element 304 on the preceding page of the application). In various embodiments, above the Planet 506 and its spinning spiral temporal element 304 are Moons 502, representing folders within the Planet 506 files. Those Moon 502 folders may be populated with data from within the application dashboard as with the Planets on the previous pages. As with the Planets, Moons 502 may be dragged and dropped by the user onto a location on the temporal spiral element in relation to its urgency relative to the user's other projects, tasks, and their respective priorities. In various embodiments, priorities amongst Moons 502 may be shown via colors and/or sounds, as well as the placement of the Moons 502 on the spinning spiral temporal element 304.

Figure 6:
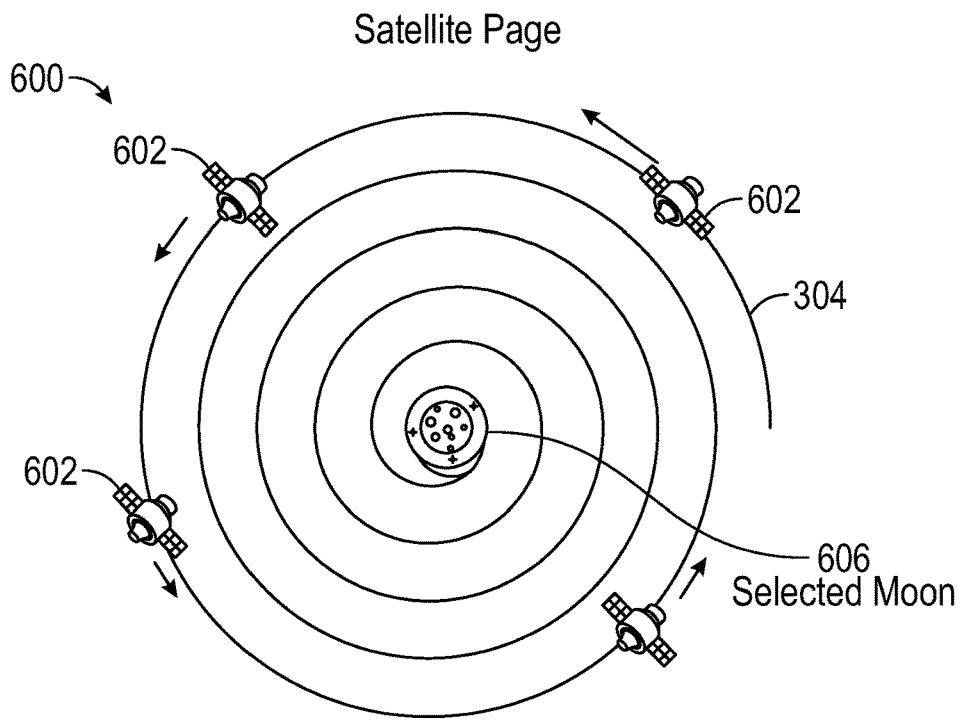
FIG. 6 is an exemplary diagram of an embodiment of the system of FIG. 1.

With reference to FIG. 6, if the user desires to access the data within the Moon 606, the user double clicks on the Moon 606 and a new page 600 is presented with the Moon 606 at the center, with its own spinning spiral temporal element 304 (in the same way that the Planet 506 was at the center of its own spinning spiral temporal element 304 on the preceding page of the Application). In various embodiments, above the Moon 606 and its spinning spiral temporal element 304 are Satellites 602, representing folders within the Moon 606 files. In various embodiments, those Satellites 602 folders may be populated with data from within the Application dashboard as with the Moons on the previous pages. As with the Moons 502, Satellites 602 may be dragged and dropped by the user onto a location on the spinning spiral temporal element 304 in relation to its urgency relative to the user's other projects, tasks, and their respective priorities. Priorities amongst Satellites 602 can be shown via colors and/or sounds, as well as the placement of the Satellites 602 on the spinning spiral temporal element 304.

In various embodiments, if the user desires to access the data within the Satellite 602, the user double clicks on the Satellite and a new page is presented with the Satellite 602 at the center, with its own spinning spiral temporal element (in the same way that the Moon was at the center of its own spinning spiral temporal element on the preceding page of the Application). In various embodiments, those Satellite folders may be populated with data from within the application dashboard as with the Moons on the previous pages. As with the Moons, Satellites may be dragged and dropped by the user onto a location on the temporal spiral element in relation to its urgency relative to the user's other projects, tasks, and their respective priorities. Priorities amongst Satellites can be shown via colors and/or sounds, as well as the placement of the Satellites on the spinning spiral temporal element.

In various embodiments, You (the End-user) are the center of your universe with spiral rings (Spinning spiral temporal element) that represent the orbit path that stars, planets, moons, etc. (folders) occupy in chronological order of present importance. In various embodiments, a user may click on the Star 302 in the closest orbit, and a page will appear with just that Star 302, and it will have similar orbit rings with planets placed in the same order of importance, and the Star 302 was on the previous page. Each planet is a file pertaining to that Star 302 folder.

In various embodiments, a user may click on the planet closest to the Star 302, or any planet, and a new page appears with just that planet and all the information attributed to that file, such as contact info, contract, scope of work, time frame. The planet, like all the others, will have its own spiral temporal element with moons, sub-files, chronologically placed with detailed scopes and notes relevant to that task.

In various embodiments, a user may click on the moon closest to the planet, or any moon, and a new page appears with just that moon and all the information attributed to that file, such as contact info, contract, scope of work, time frame. The moon, like all the others, will have its own spiral temporal element with sub-files, chronologically placed with detailed scopes and notes relevant to that task.

In various embodiments, comets, or events, for example, weddings or vacations, approach the center as the date draws closer. In various embodiments, a user may drag and drop files and folders (stars, planets, moons, satellites) onto spiral temporal elements.

In various embodiments, a user may initiate a project, event, task, etc. (stars, planets, moons, satellites also called entities) In various embodiments, the project, task, etc. may employ a data entry calendar like airlines use to book flights, that allows user to easily set start and finish dates within the entities. The application allows the user to characterize text as dormant (entity colored red as it waits dormant for its start date). Once the dormant entity is placed in the pending area (perhaps above the central orbit spiral) (automatically through the application or manually by the user) it turns yellow as it takes a position on the spiral and moves toward the start date that has been established with the auto-calendar within the entity.

In various embodiments, when the start date is reached the entity turns the color green and re-establishes itself on the spiral now heading toward the finish date. The User receives an alert (via text, e-mail, and/or an alarm on the mobile device) that the Project task, etc. has commenced. This Project will remain green until it reaches the end date entered into the entity through the auto-calendar. Both start and finish dates can be changed and re-entered, re-establishing directed color and position on the spiral.

In various embodiments, when the entity reaches that end date the entity will remain green and start blinking. Again the user receives a text notification, e-mail and/or alarm stating that the Project, task, etc. has been completed. In various embodiments, the user may be p[resented with a choice as follows: a. If the project, task event is not actually finished (i.e., delays, stoppages, etc.) then the user can re-enter tasks to be completed within each element and reestablish a time frame for commencement and end date using the data entry technology in (i) above; or, b. If the project, task event (stars, planets, moons, satellites) is finished, the User can manually move the entire project, task event (stars, planets, moons, satellites) to a storage archive.

In various embodiments, the user may drag and drop or copy files and folders and (stars, planets, moons, satellites) and data of one planet or moon to another Star 302 where there are similar or common elements across stars, planets, moons, and satellites.

In various embodiments, users may view in 2D in the application dashboard all data and tasks that exist so the users can view their universe on a single page or series of pages. In various embodiments, all user interactions may be recorded so that the user can at any time (a) review the allocation of time to various personal and business matters; and, (b) create a chronological record of user's actions taken and work performed using the application; and, (c) create a Facebook like montage of the year in review; and (d) the user can assess where time was efficiently deployed and where changes need to be made.

In various embodiments, the application may include various analytics capabilities, which include among other things ability to determine efficiency ratios between work and personal related matters, along with a feature that shows you where you have available time for personal or business interests based on what you have entered into the platform. In various embodiments, the application may include the ability to track time and incorporate into billing statements for clients and the ability to review prior year, month, week, day efficiency.

In various embodiments, the application may integrate with and interact with users existing contact list. In various embodiments, Stars, planets, moons, satellites grow in size as they get closer and should show the arrival date so it can automatically station itself on the temporal spiral element at any level of the application.

In various embodiments, the application may allow the user to upload documents and other information to star, planet, moon and satellite folders and store files. Search capability within the application to locate documents and other data uploaded from within the application.

In various embodiments, the application may include a dashboard for management of the application and inputting of data, documents, and information. In various embodiments, the application may allow the user to link projects (Stars) to one another, i.e., completion of one project (Star) activates another project (Star).

In various embodiments, the application may allow the user to zoom in and out of the various files, folders, and the entire Universe to get a high-level view of the files, the folders, and the entire Universe using both a map capability and a pinch in pinch-out functionality. In various embodiments, the application may provide ethereal audio effects that the user can choose from within the Application Dashboard. In various embodiments, the application may include an API for integration with third-party providers.

In various embodiments, the application may include a graphic that can be accessed simply by a user explaining what each color stands for.

In various embodiments, the system may send and share documents, files, and folders (Stars, planets moons with other team members and third parties through the Application. In various embodiments, the system may allow collaborative video conference capabilities amongst team members through the application. In various embodiments, a shooting star is like a group text or email with the ability to comment on anything within the universe (i.e., data, timeframes, tasks required, etc.). A number on the star notifies the recipient of the message. In various embodiments, a user may tap the number, and the message appears, and the user can reply to the message.

In various embodiments, a user can share limited information with certain designated team members at the discretion of the project manager. Member authorization and limitations may be set by the project manager ("PM") via the sharing of only the entity that the project manager desires to share with a particular member. All information relative to the shared entity and all downstream entities will be available to the recipient. For example, if the project manager wants to share all of the information in connection with a project, the PM would send the Star to the recipient member. The info can, in other instances be limited by the type of entity that the PM shares (i.e. planet, moon or satellite) with a particular member. For example if the user sends a planet to a recipient member, only the information contained within that planet and all downstream information connected to that planet will be available to the recipient member but not any other information.

In various embodiments, the recipient member receives a notification within the App, and via text and email, indicating that the PM or another authorized member has sent an entity or other information to the recipient member. The recipient member can view the entity or information received by tapping on the notification button.

In various embodiments, when the recipient member receives a notification within the App, and via text and email, indicating that the PM or another authorized member has sent an entity or other information to the recipient member, when the recipient member taps on the notification button, a pop up gives the recipient a view of the entity sent. When the user taps on the entity, the entity appears in the middle of its own spiral, and any orbiting bodies will also appear. When the received entity is tapped in the middle of the spiral, its drop-down page will appear, and any changes will be available to read, and you can add your own comments, documents, etc, to the project.

In various embodiments, a recipient member who has not registered for the App, receives a notification via text and email, indicating that the PM or another authorized member has sent an entity or other information to the recipient member, containing a link to a website providing information about the application as well as direct links to the apple store and Google play to download the application. In various embodiments, the application is configured to be voice-activated. For example, a user may say "add to notes for the planet 'Books'" and the application will open a notes screen in the planet 406 "Books" (FIG. 3).

Figure 7:
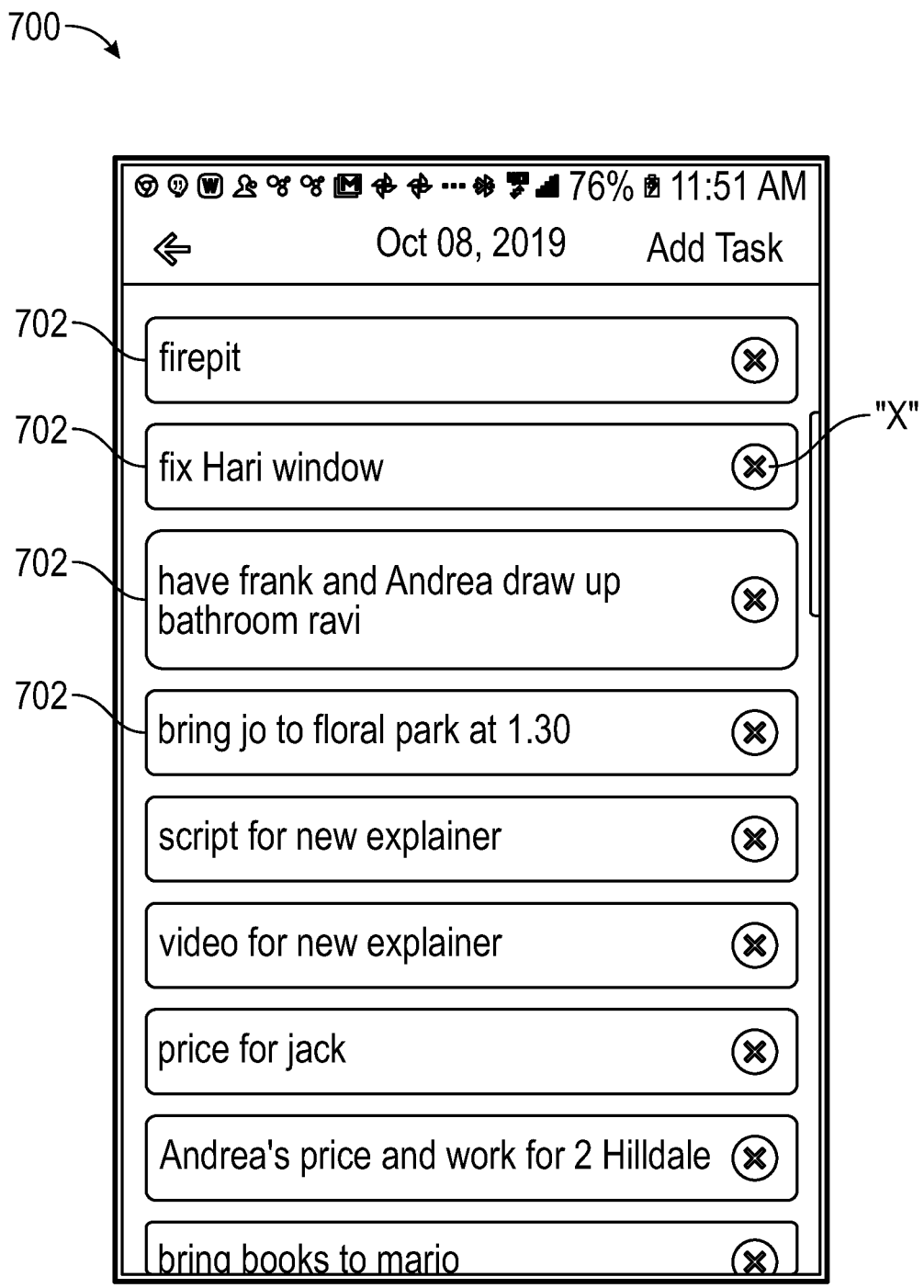
FIG. 7 is an exemplary wireframe of an embodiment of the system of FIG. 1.
Figure 8:
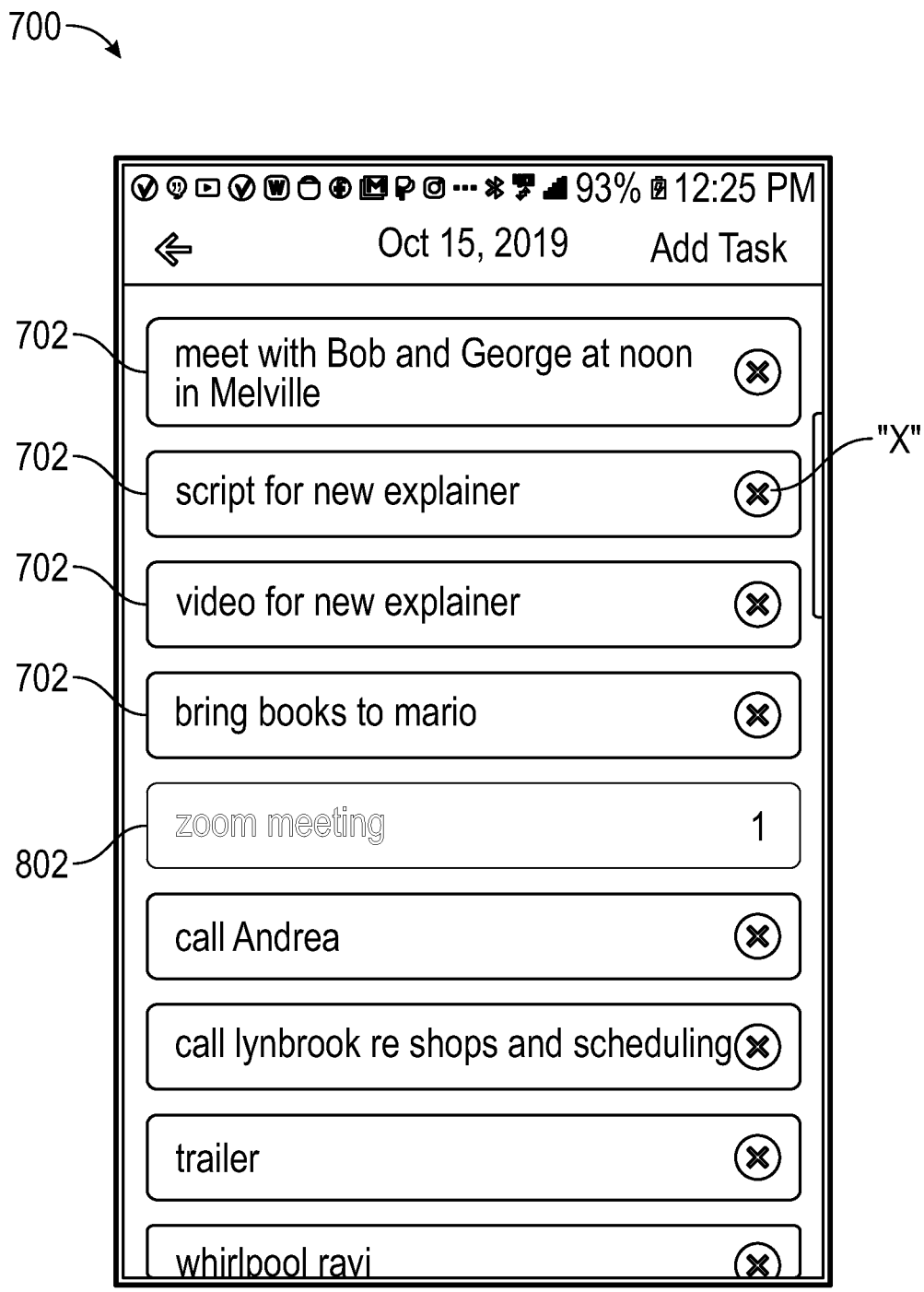
FIG. 8 is an exemplary wireframe of an embodiment of the system of FIG. 1.

With reference to FIGS. 7 and 8, a wireframe of a To-Do list screen 700 in accordance with the present disclosure is shown. In various embodiments, the system may display, on the display, a To-Do list displaying the tasks 702 that are due today. In various embodiments, the system may keep a running list of daily To-Do tasks. In various embodiments, the user may move a task 702 from today to tomorrow by swiping the task 702. The user may also swipe a task 702 from an older date in the To-Do list, and the task will appear on the To-Do list for the current date. Other touch gestures are contemplated. In various embodiments a task may become "ghosted" or transparent 802 when moved to tomorrow (see FIG. 8). For example, if a user wants to move a task 702 such as a meeting from today to tomorrow, they would swipe the meeting task to the right, and it would become transparent 802 and would be moved to the following day's to-do list.

In various embodiments, when a task is completed, the color of the task may change (e.g., to red, orange, green, or another color) to designate that the task is complete. In various embodiments, the user may press the "x" on the task to delete the task.

In various embodiments, a user may input a person's name in the application, and the system would sync to the person's contact information in the user's contacts on their device. For example, if the user had a meeting with Robert Smith on Tuesday at 1 PM, the system would sync the contact info for Robert Smith based on the user's contacts for Robert Smith. Thus, when the user opens the meeting, Robert Smith's contact info would be available for the user.

In various embodiments, when a user establishes that a particular task is time-sensitive, the user can set a time within the Application so that once the time is reached, a text message will be pushed to the user notifying them of the time-sensitive task, and an alarm will sound within the Application notifying the user that the time established by the user for the task has been reached.

Figure 9:
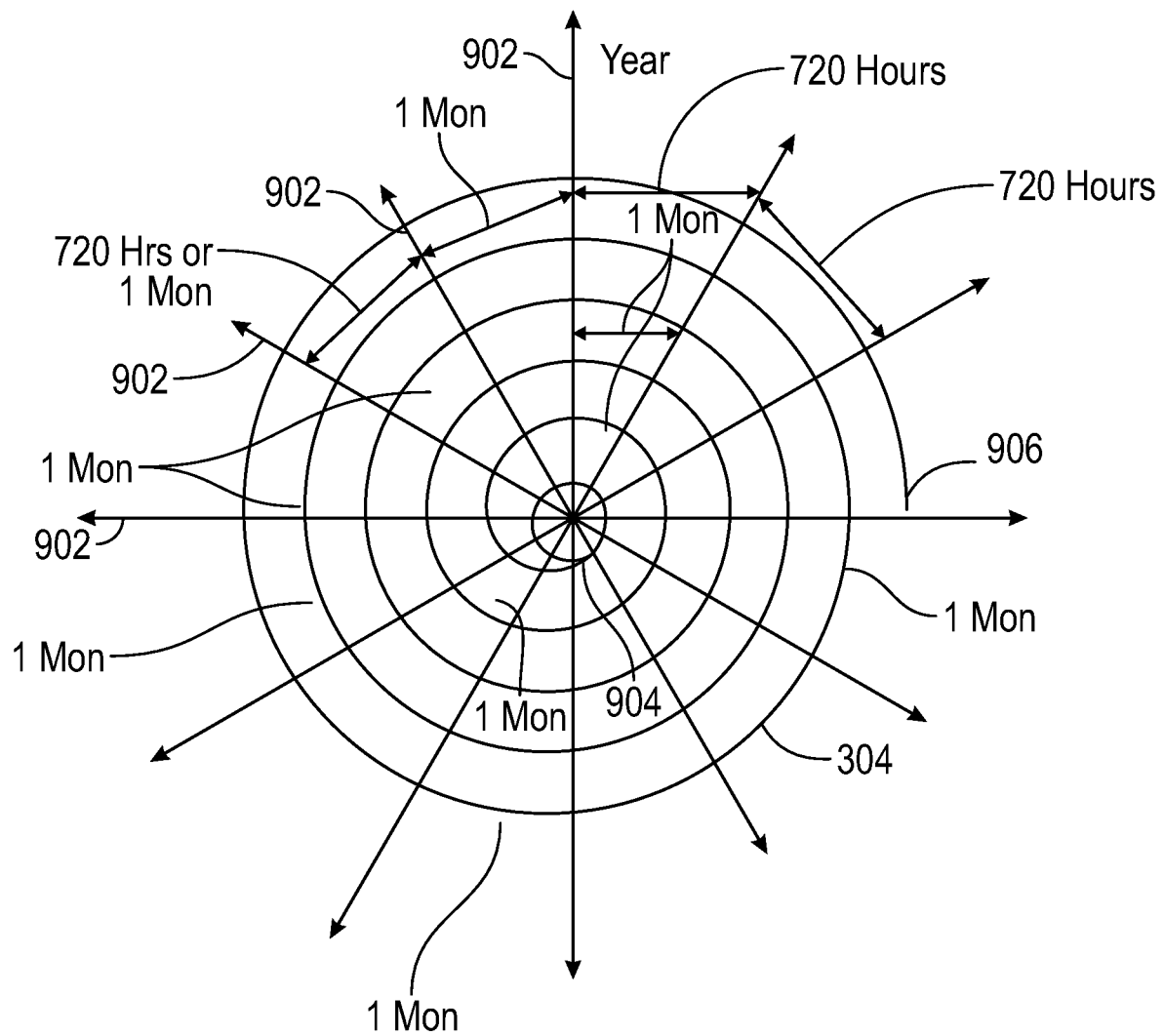
FIG. 9 is an exemplary diagram of an embodiment of the system of FIG. 1.

With reference to FIG. 9, a spinning spiral temporal element 304, is shown in accordance with the present disclosure. The spinning spiral temporal element 304 includes a first position 904 at the center of the spinning spiral temporal element 304 and a second position 906 at an outer most end of the spinning spiral temporal element 304. In various embodiments, the spinning spiral temporal element 304 may be subdivided into smaller units using radius lines 902. For example, the spinning spiral temporal element 304 may be divided into twelve positions using radius lines 902. In various embodiments, the radius lines are not visible but create star 302, planet 402, or moon 502 placement on the spinning spiral temporal element 304. For example, the twelve radius lines 902 may represent months. In various embodiments, the placement includes a predetermined number of placement positions (e.g., the number of months in a year, the number of days in a week, etc.), where the distance between positions (i.e., the spacing of the positions) decreases non-linearly as position approaches the center of the spinning spiral temporal element 304. For example, if the spinning spiral temporal element 304 is displaying a year's time frame, there may be twelve positions relating to twelve months. The spacing between positions twelve and eleven may be longer than the spacing between positions eleven and ten. The spacing between positions ten and nine is nonlinearly smaller than that of the spacing between positions eleven and ten and the spacing between positions twelve and eleven.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A computer-implemented method of display of project management timelines, the method comprising:
    displaying a spinning spiral temporal element with rings, starting from a center and moving outwards over time, including one or more stars disposed on the rings in chronological order, wherein each star includes a folder;
    selecting a star in the closest orbit;
    displaying a page containing the selected star at the center of a spinning spiral temporal element with spiral rings, starting from a center and moving outwards over time, including one or more planets disposed on the rings in chronological order of present importance, wherein each planet includes a folder;
    displaying, on a display, a task list, the task list including one or more tasks due on a particular day;
    determining if one task of the one or more tasks is swiped on the display;
    changing a translucence of the task based on the determination; and
    setting time parameters for time-sensitive tasks wherein a user is notified about a time-sensitive task,
    wherein the planet includes at least one of contact info, contract, scope of work, upload documents, or time frame.

2. The computer-implemented method of claim 1, wherein the method further includes:
    selecting a planet; and
    displaying a page containing the selected planet at the center of a spinning spiral temporal element with rings, starting from a center and moving outwards over time, including one or more moons disposed on the rings in chronological order of present importance, wherein each moon includes a folder,
    wherein the moon includes at least one of contact info, contract, scope of work, upload documents, or time frame.

3. The computer-implemented method of claim 1, wherein at least one of comets or events, approach a center as a date draws closer.

4. The computer-implemented method of claim 1, wherein the spinning spiral temporal element further includes a predetermined number of subdivisions configured to organize each star,
    wherein each star aligns with one of the predetermined number of subdivisions.

5. The computer-implemented method of claim 1, further including the ability to collaborate and interact with select members within the project by at least one of email, text, video, or chat by sending an entity to a recipient.

6. The computer-implemented method of claim 1, further including:
   sending at least one of videos, texts, or e-mails to at least one of an existing member or a non-member, to permit two-way collaboration and interaction between sender and recipient; and
   restricting information which a recipient is permitted to see and access.

7. The computer-implemented method of claim 1, further including:
   transmitting a notification, to a recipient, that a user has sent them information relevant to a project or task;
   receiving, by the recipient, the notification;
   displaying by a notification icon that a notification is available; and
access, by the recipient, the information from a notification icon based on tapping on the notification.

8. A computer-implemented method of display of project management timelines comprising:
   dragging and dropping at least one first element from a first area to a second area, the at least one first element includes at least one of a main project, a task, a business task, or a personal task;
      wherein the second area includes a spinning spiral temporal element with spiral rings, starting from a center and moving outwards over time;
      wherein the second area is set from at least one of an hour, a day, a week, a month, or a year;
      wherein the at least one first element includes a due date;
      wherein after the dragging and dropping, the least one first element is displayed in chronological order on the spinning spiral temporal element;
   moving the at least one first element along the spinning spiral temporal element based on at least one of a current time or a current date;
   selecting one at least one first element;
   accessing information contained within the at least one first element; and
   displaying, on a display, a task list, the task list including one or more tasks due on a particular day;
   determining if one task of the one or more tasks is swiped on the display;
   changing a translucence of the task based on the determination; and
   setting time para meters for time-sensitive tasks wherein a user is notified about a time-sensitive task.

9. A system for display of project management timelines comprising:
   a processor; and
   a memory that is coupled to the processor and stores one or more computer-readable instructions, wherein the computer-readable instructions cause, when executed by the processor, the system to:
      display a first spinning spiral temporal element with spiral rings, starting from a center and moving outwards over time, including one or more stars disposed on the rings in chronological order of present importance, wherein each star includes a folder;
      select a star;
      display a page containing the selected star at the center of a spinning spiral temporal element with spiral rings, starting from a center and moving outwards over time, including one or more planets disposed on the rings in chronological order of present importance, wherein each planet includes a folder; and
      display, on a display, a task list, the task list including one or more tasks due on a particular day;
      determine if one task of the one or more tasks is swiped on the display;
      change a translucence of the task based on the determination; and
      set time parameters for time-sensitive tasks wherein a user is notified about a time-sensitive task,
      wherein the planet includes at least one of contact info, contract, scope of work, upload documents, or time frame.

10. The system of claim 9, wherein the instructions when executed further cause the system to:
   select a planet; and
   display a page containing the selected planet at the center of a spinning spiral temporal element with spiral rings, starting from a center and moving outwards over time, including one or more moons disposed on the rings in chronological order of present importance, wherein each moon includes a folder,
   wherein the moon includes at least one of contact info, contract, scope of work, upload documents, or time frame.

11. The system of claim 9, wherein at least one of comets or events, approach the center as a date draws closer.

12. The system of claim 9, wherein the spinning spiral temporal element further includes a predetermined number of subdivisions configured to organize each star,
   wherein each star aligns with one of the predetermined number of subdivisions.

13. The system of claim 9, further including the ability to collaborate and interact with select members within the project via email, text, video and chat by sending an entity to a recipient.

14. The system of claim 9, wherein the instructions when executed further cause the system to:
   send at least one of videos, texts, or e-mails to at least one of an existing member or a non-member, to permit two-way collaboration and interaction between sender and recipient; and
   restrict information which a recipient is permitted to see and access.

15. The system of claim 9, further including the ability to notify a recipient that a user has sent them and entity or other information relevant to a project or task and the ability of the recipient to access the entity or information from a notification icon based on tapping on the notification.

16. The system of claim 9, wherein the spinning spiral temporal element includes:
   a first position;
   a second position; and
   a predetermined number of placement positions, wherein a distance between positions decreases non-linearly starting from the second position of the spinning spiral temporal element as the placement position approaches the first position of the spinning spiral temporal element.

17. A system for display of project management timelines comprising:
   a processor; and
   a memory that is coupled to the processor and stores one or more computer-readable instructions, wherein the computer-readable instructions cause, when executed by the processor, the system to:

display a first temporal element with graphical indicia, starting from a first location of the temporal element and moving towards a second location of the temporal element over time, including one or more first elements disposed on the graphical indicia in chronological order of present importance, wherein each of the one or more first elements includes a folder;

select one of the one or more first elements;

display a page containing the selected one or more first elements at a particular location of a second temporal element with graphical indicia, starting from a first location of the second temporal element and moving towards a second location of the second temporal element over time, including one or more second elements disposed on the graphical indicia in chronological order of present importance, wherein each of the one or more second elements includes a folder; and display, on a display, a task list, the task list including one or more tasks due on a particular day;

determine if one task of the one or more tasks is swiped on the display;

change a translucence of the task based on the determination; and set time parameters for time-sensitive tasks wherein a user is notified about a time-sensitive task, wherein the one or more second elements includes at least one of contact info, contract, scope of work, upload documents, or time frame.

18. The system of claim 17, wherein the first and second temporal element includes:
a first position;
a second position; and
a predetermined number of placement positions, wherein a distance between positions decreases non-linearly starting from the second position of the temporal element as the placement position approaches the first position of the temporal element.

19. The system of claim 17, wherein the instructions when executed further cause the system to:
select a second element; and display a page containing the selected second element at the center of a third temporal element with graphical indicia, starting from a first location of the temporal element and moving towards a second location of the temporal element over time, including one or more third elements disposed on the graphical indicia in chronological order of present importance, wherein each of the one or more third elements includes a folder, wherein the third element includes at least one of contact info, contract, scope of work, upload documents, or time frame.

20. The system of claim 17, wherein at least one of comets or events, approach the center as a date draws closer.

21. The system of claim 17, wherein the first temporal element with graphical indicia further includes a predetermined number of subdivisions configured to organize each first element,
wherein each first element aligns with one of the predetermined number of subdivisions.

22. The system of claim 17, further including the ability to collaborate and interact with select members within the project via email, text, video and chat by sending an entity to a recipient.

23. The system of claim 17, wherein the instructions when executed further cause the system to:
send at least one of videos, texts, or e-mails to at least one of existing members and/or others to permit two-way collaboration and interaction between sender and recipient; and
restrict information which a recipient is permitted to see and access.

24. The system of claim 17, wherein the instructions when executed further cause the system to:
transmit a notification, to a recipient, that a user has sent them information relevant to a project or task;
receive, by the recipient, the notification;
display by a notification icon that a notification is available; and
access, by the recipient, the information from a notification icon via by tapping on the notification.

* * * * *